(12) United States Patent
Park et al.

(10) Patent No.: US 8,879,838 B2
(45) Date of Patent: Nov. 4, 2014

(54) IMAGE CODING METHOD AND APPARATUS AND IMAGE DECODING METHOD AND APPARATUS, BASED ON CHARACTERISTICS OF REGIONS OF IMAGE

(75) Inventors: Min-woo Park, Suwon-si (KR); Pil-kyu Park, Seoul (KR); Dae-sung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/571,411

(22) Filed: Aug. 10, 2012

(65) Prior Publication Data

US 2013/0202201 A1  Aug. 8, 2013

(30) Foreign Application Priority Data

Feb. 2, 2012  (KR) .................. 10-2012-0010843

(51) Int. Cl.
*G06K 9/00* (2006.01)
*G06K 9/36* (2006.01)

(52) U.S. Cl.
USPC .......................................... 382/165; 382/166

(58) Field of Classification Search
None
See application file for complete search history.

(56) References Cited

U.S. PATENT DOCUMENTS

| 7,783,117 | B2 * | 8/2010 | Liu et al. ...................... 382/232 |
| 8,194,188 | B2 * | 6/2012 | Nagajjanavar ................ 348/584 |
| 2004/0021592 | A1 * | 2/2004 | Karczewicz .................... 341/67 |
| 2006/0221411 | A1 * | 10/2006 | Aoki ............................. 358/474 |
| 2007/0053602 | A1 * | 3/2007 | Kanatsu ........................ 382/244 |
| 2007/0189615 | A1 * | 8/2007 | Liu et al. ...................... 382/232 |
| 2008/0080764 | A1 * | 4/2008 | Kim et al. ..................... 382/162 |
| 2008/0198270 | A1 | 8/2008 | Hobbs et al. |
| 2008/0244384 | A1 * | 10/2008 | Yoshitani ..................... 715/251 |

\* cited by examiner

*Primary Examiner* — Bhavesh Mehta
*Assistant Examiner* — Feng Niu
(74) *Attorney, Agent, or Firm* — Sughrue Mion, PLLC

(57) ABSTRACT

Methods of efficiently coding and decoding an image by analyzing each of regions of the image are provided. In the image coding method, an image format and a coding mode of a first region of an image are determined, whether a current image format of the first region is to be switched is determined based on the determined image format, and the first region is coded based on the determined image format and coding mode.

28 Claims, 9 Drawing Sheets

IMAGE CODING METHOD AND APPARATUS AND IMAGE DECODING METHOD AND APPARATUS, BASED ON CHARACTERISTICS OF REGIONS OF IMAGE

CROSS-REFERENCE TO RELATED PATENT APPLICATION

This application claims priority from Korean Patent Application No. 10-2012-0010843, filed on Feb. 2, 2012, in the Korean Intellectual Property Office, the disclosure of which is incorporated herein in its entirety by reference.

BACKGROUND

1. Field

Methods and apparatuses consistent with exemplary embodiments relate to coding and decoding an image.

2. Description of the Related Art

In general, a screen image may be transmitted according to one of two methods. In a first method, graphic commands that are provided from a system to render a screen image are extracted and transmitted. In a second method, a rendered screen image is coded and transmitted in the form of a bitmap.

According to the first method, a transmission bandwidth may be reduced by transmitting/receiving graphic commands. However, a client should process the graphic commands to render a screen image and should thus be capable of processing a large amount of graphic commands. According to the second method, a client may process and display a screen image by using a general image coding method or a general video coding method. Thus, the client is required to have lower capabilities to process graphic data when the second method is used than when the first method is used.

As cloud computing technology has come into widespread use, there is a growing need to develop a screen image transmission method that may be easily performed by even a client having lower computing capabilities. Thus, the second method that processes a screen image in the form of a bitmap is expected to be more popular than the first method that uses graphic commands.

SUMMARY

One or more exemplary embodiments may provide an image coding method and apparatus for determining an image format and a coding mode by analyzing characteristics of regions of an image, and an image decoding method and apparatus.

According to an aspect of an exemplary embodiment, there is provided a method of coding an image, the method including determining an image format and a coding mode of each of regions of the image; determining whether a current image format of a first region from among the regions of the image is to be switched, based on the determined image format; and coding the first region, based on the determined image format and coding mode. The coding of the first region may include switching the current image format of the first region to the determined image format, based on a result of the determining of whether the current image format of the first region is to be switched.

The determining of the image format and the coding mode may include analyzing image characteristics of the first region; and determining the image format and the coding mode of the first region, based on a result of the analyzing.

The analyzing of the image characteristics of the first region may include determining a number of colors of the first region; and determining a gradation of a chroma component of the first region. The analyzing of the image characteristics of the first region may further include determining the first region as a synthetic image region, a natural image region, a text region, or a gradation region, based on the determined number of colors and the determined gradation of the chroma component.

The determining of the image format and the coding mode may include determining a color format of the first region as a first color format for the synthetic image region, a second color format for the natural image region, a third color format for the text region, or a fourth color format for the gradation region; and determining the coding mode of the first region as a first coding mode for the synthetic image region, a second coding mode for the natural image region, a third coding mode for the text region, or a fourth coding mode for the gradation region.

The coding of the first region may include coding the first region based on at least one of transformation domain coding and pixel domain coding, according to the determined coding mode. The switching of the current image format of the first region may include switching at least one of a color model and a color resolution of the current color format of the first region, according to the determined image format.

According to another aspect of an exemplary embodiment, there is provided a method of decoding an image, the method including parsing image format information, coding mode information, and code image data in units of regions of a coded image, from a bit stream containing the coded image; determining an image format and a decoding mode of a first region, based on the image format information and the coding mode information that are parsed in units of the regions of the coded image; decoding coded image data of the first region, based on the determined image format and decoding mode; and determining whether a current image format of the first region is to be inversely switched, based on the determined image format.

The determining of whether the current image format of the first region is to be inversely switched may include inversely switching the current image format to the determined image format, based on a result of the determining of whether the current image format of the first region is to be inversely switched.

The determining of the image format and the decoding mode may include obtaining an image format and a coding mode that are determined by analyzing image characteristics of the first region.

The decoding of the coded image data of the first region may include decoding the first region based on at least one of transformation domain decoding and pixel domain decoding, according to the determined decoding mode. The inverse switching of the current image format of the first region may include inversely switching at least one of a color model and a color resolution of the current color format of the first region, according to the determined image format.

According to another aspect of an exemplary embodiment, there is provided an apparatus for coding an image, the apparatus including a region format mode determiner which determines an image format and a coding mode of each of regions of the image; a region format switch which determines whether a current image format of a first region from among the regions of the image is to be switched, based on the determined image format, and switching the current image format to the determined image format, based on a result of the determining of whether the current image format of the first region is to be switched; a region coder which codes the first region, based on the determined image format and coding mode; and a processor which controls operations of the region format mode determiner, the region format switch, and the region coder.

According to another aspect of an exemplary embodiment, there is provided an apparatus for decoding an image, the apparatus including a bit stream parser which parses image format information, coding mode information, and code image data in units of regions of a coded image, from a bit stream containing the coded image; a region format mode determiner which determines an image format and a decoding mode of a first region, based on the image format information and the coding mode information that are parsed in units of the regions of the coded image; a region decoder which decodes coded image data of the first region, based on the determined image format and decoding mode; a region format inverse switch which determines whether a current image format of the first region is to be inversely switched, based on the determined image format, and inversely switching the current image format to the determined image format, based on a result of the determining of whether the current image format of the first region is to be inversely switched; and a processor which controls operations of the bit stream parser, the region format mode determiner, the region decoder, and the region format switch.

According to another aspect of an exemplary embodiment, there is provided a computer readable recording medium having recorded thereon a computer program for executing the method of coding an image.

According to another aspect of an exemplary embodiment, there is provided a computer readable recording medium having recorded thereon a computer program for executing the method of decoding an image.

BRIEF DESCRIPTION OF THE DRAWINGS

The above and/or other aspects will become more apparent by describing in detail exemplary embodiments thereof with reference to the attached drawings in which.

DETAILED DESCRIPTION

Hereinafter, exemplary embodiments of a method and apparatus for coding an image by determining an image format and a coding mode for each of regions of the image, and a method and apparatus for decoding an image, will be described in greater detail with reference to FIGS. 1 to 11.

As used herein, the term 'and/or' includes any and all combinations of one or more of the associated listed items. Expressions such as 'at least one of' when preceding a list of elements, modify the entire list of elements and do not modify the individual elements of the list.

Figure 1:
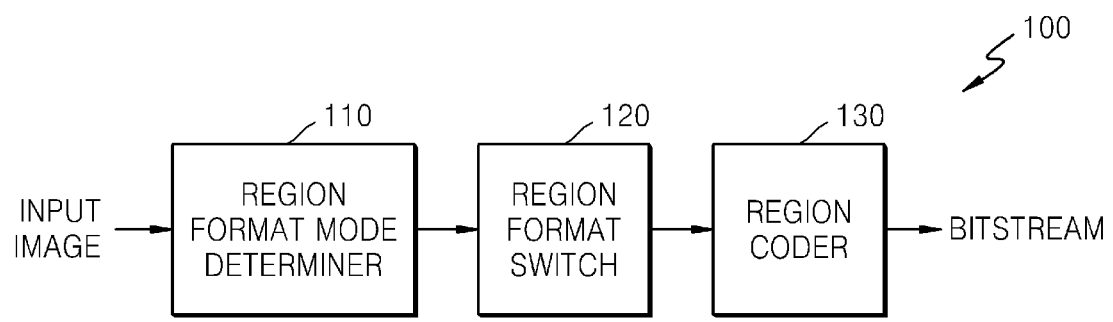
FIG. 1 is a block diagram of an image coding apparatus according to an exemplary embodiment.

FIG. 1 is a block diagram of an image coding apparatus 100 according to an exemplary embodiment. Referring to FIG. 1, the image coding apparatus 100 includes a region format mode determiner 110, a region format switch 120, and a region coder 130.

The image coding apparatus 100 may further include a central processing unit (CPU) (not shown) for controlling all operations of the region format mode determiner 110, the region format switch 120, and the region coder 130. Otherwise, each of the region format mode determiner 110, the region format switch 120, and the region coder 130 may be operated under control of an individual processor thereof (not shown), and overall operations of the image coding apparatus 100 may be performed when the individual processors operate interactively with one another. Otherwise, the region format mode determiner 110, the region format switch 120, and the region coder 130 may be controlled by an external processor of the image coding apparatus 100.

The image coding apparatus 100 may further include at least one data storage (not shown), such as a memory, a buffer, or a cache memory, to store data input to or output from the region format mode determiner 110, the region format switch 120, and the region coder 130. The image coding apparatus 100 may further include a memory controller (not shown) to control data to be input to or output from the data storage.

To code an input image by using the image coding apparatus 100, the region format mode determiner 110 divides the input image into a plurality of regions and determines at least one of an image format and a coding mode for each of the plurality of regions. The region format switch 120 switches a current image format of an input image region to a corresponding image format from among the determined image formats for each of the regions of the image. The region coder 130 codes the input image region, based on the determined corresponding image format and coding mode.

The region format mode determiner 110 may determine at least one of an image format and a coding mode of a first region from among the plurality of regions of the input image. The region format switch 120 may determine whether to switch a current image format of the first region. The region format switch 120 may switch the current image format of the first region to the image format of the first region determined by the region format mode determiner 110, based on the determination as to whether to switch the current image format of the first region.

In other words, if it is determined that the current image format of the first region is to be switched, the region format switch 120 may switch the current image format of the first region to the determined image format thereof and then output the switched image format of the first region to the region coder 130. If it is determined that the current image format of the first region is not to be switched, the region format switch 120 may directly output the first region to the region coder 130 without switching the current image format of the first region.

If the image format of the first region determined by the region format mode determiner 110 is different from the current image format of the first region, the region format switch 120 may determine the current image format of the first region to be switched to the determined image format thereof.

The region coder 130 may receive the first region from the region format switch 120, and code the first region based on the coding mode of the first region determined by the region format mode determiner 110. Otherwise, the region coder 130 may code the first region, based on the image format and coding mode of the first region determined by the region format mode determiner 110.

The region format mode determiner 110 may analyze image characteristics of the first region. The region format mode determiner 110 may determine the image format and coding mode of the first region, based on a result of the analyzing.

For example, the region format mode determiner 110 may determine a number of colors of the first region. Also, the region format mode determiner 110 may determine a gradient of a chroma component of the first region. The gradient of the chroma component represents a variation in the chroma component. The variation in the chroma component may be represented using the differences between pixel values of the chroma component.

The region format mode determiner 110 may determine the first region as a synthetic image region, a natural image region, a text region, and a gradation region, based on the determined number of colors and gradient of the chroma component. The synthetic image region may include primary color components.

For example, if the number of colors of the first region is equal to or greater than a first threshold, the region format mode determiner 110 may determine the first region as the synthetic image region or the natural image region. If the number of colors of the first region is less than the first threshold, the region format mode determiner 110 may determine the first region as the text region or the gradation region.

For example, if the gradient of the chroma component of the first region is equal to or greater than a second threshold, the region format mode determiner 110 may determine the first region as the synthetic image region or the text region. If the gradient of the chroma component of the first region is less than the second threshold, the region format mode determiner 110 may determine the first region as the natural image region or the gradation region.

Then, the region format mode determiner 110 may select a color format of the first region from among a first color format for the synthetic image region, a second color format for the natural image region, a third color format for the text region, and a fourth color format for the gradation region.

Also, the region format mode determiner 110 may select a coding mode of the first region from among a first coding mode for the synthetic image region, a second coding mode for the natural image region, a third coding mode for the text region, and a fourth coding mode for the gradation region.

As another example, the region format mode determiner 110 may variably determine an image format and coding mode of an input image, based on a control signal.

As another example, the region format mode determiner 110 may variably determine an image format and coding mode of the first region, based on the result of the analyzing and the control signal. For example, the image format and coding mode of the first region may be determined based on the result of the analyzing and the control signal, respectively. For example, whether the first region is the synthetic image region, the natural image region, the text region, or the gradation region may be determined according to the control signal, and the gradient of the chroma component may be determined according to the result of the analyzing.

As another example, the region format mode determiner 110 may switch an image format of the first region to each of a plurality of image formats, code the first region according to each of a plurality of coding modes, and compare results of the switching and the results of the coding. Then, the region format mode determiner 110 may determine a combination of an image format and a coding mode, which produces a highest coding efficiency, from among combinations each including one of the plurality of image formats and one of the plurality of coding modes.

The region format mode determiner 110 may determine at least one of transformation domain coding and pixel domain coding as a coding mode of the first region. The region coder 130 may code the first region according to the determined at least one coding mode, i.e., at least one of transformation domain coding and pixel domain coding.

The region format mode determiner 110 may determine at least one of a color model and a color resolution of a color format as an image format of the first region. Examples of a color model that may be selected as a color format of the first region may include an RGB model and a YUV model. The color resolution may be expressed as a ratio between an R component, a G component, and a B component of the RGB model or a ratio between a Y component, a U component, and a V component of the YUV model. Examples of a color resolution that may be selected as an image format of the YUV model for the first region may include YUV 4:4:4, YUV 4:2:2, and a YUV 4:2:0.

The region format switch 120 may switch at least one of the color model and the color resolution of the first region according to an image format of the first region. For example, if both the color model and the color resolution of the first region are to be switched, the region format switch 120 may switch a current color model to a determined color model, and downsample or up-sample a current color resolution to a determined color resolution.

The image coding apparatus 100 may output at least one of information about image formats of and information about coding modes of the plurality of regions of the input image, via a bit stream containing a result of coding the input image. The image coding apparatus 100 may include at least one of the information about image formats of and the information about coding modes into a bit stream containing the result of the coding of the input image, and then output the bit stream.

Figure 2:
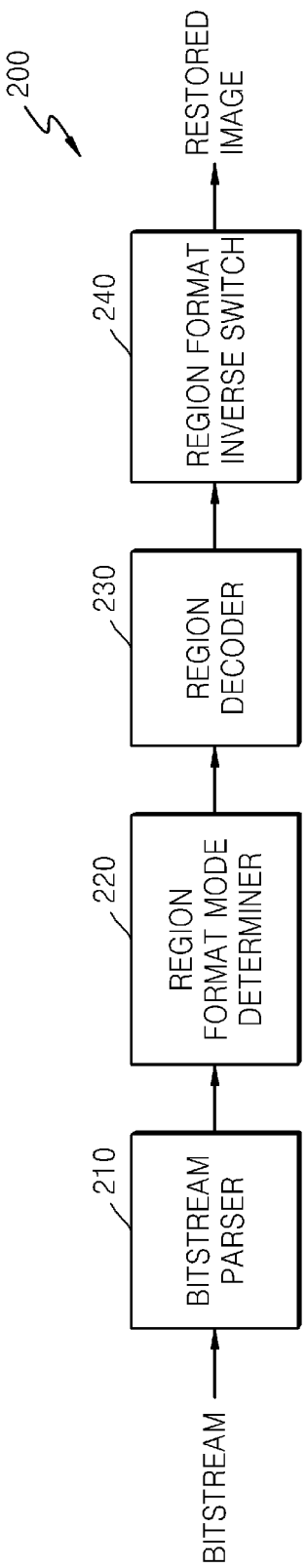
FIG. 2 is a block diagram of an image decoding apparatus according to an exemplary embodiment.

FIG. 2 is a block diagram of an image decoding apparatus 200 according to an exemplary embodiment. The image decoding apparatus 200 may include a bit stream parser 210, a region format mode determiner 220, a region decoder 230, and a region format inverse switch 240.

According to an exemplary embodiment, the image decoding apparatus 200 may include a CPU (not shown) for controlling all operations of the bit stream parser 210, the region format mode determiner 220, the region decoder 230, and the region format inverse switch 240. Otherwise, each of the bit stream parser 210, the region format mode determiner 220, the region decoder 230, and the region format inverse switch 240 may be operated under control of an individual processor thereof (not shown), and overall operations of the image decoding apparatus 200 may be performed when the individual processors operate interactively with one another. Otherwise, the bit stream parser 210, the region format mode determiner 220, the region decoder 230, and the region format inverse switch 240 may be controlled by an external processor of the image decoding apparatus 200.

According to an exemplary embodiment, the image decoding apparatus 200 may further include at least one data storage unit (not shown), such as a memory, a buffer, or a cache memory, to store data input to or output from the bit stream parser 210, the region format mode determiner 220, the region decoder 230, and the region format inverse switch 240. The image decoding apparatus 200 may further include a memory controller (not shown) to control data to be input to or output from the data storage unit.

To receive and decode a bit stream of a coded image by using the image decoding apparatus 200, the bit stream parser 210 parses at least one of information about image formats of a plurality of regions of the coded image, information about coding modes of the plurality of regions, and data of the coded image.

The region format mode determiner 220 may determine at least one of an image format and a decoding mode of the coded image, based on at least one of the parsed information about the image formats of the plurality of regions of the coded image and information about the coding modes of the plurality of regions. The region decoder 230 decodes the coded image based on the decoding mode determined by the region format mode determiner 220. The region format inverse switch 240 inversely switches a current image format of a first region from among the plurality of regions, based on the image format determined by the region format mode determiner 220. If the determined image format is the original image format of the original image that was not coded, the region format inverse switch 240 may restore the original image format by inversely switching the current image format of the first region to the determined image format.

The region format mode determiner 220 may determine an image format and decoding mode of the first region, based on the parsed information about the image format and coding mode of the first region, which is included in the parsed information about the image formats and information about the coding modes. The region decoder 230 may decode coded data of the first region, based on the decoding mode of the first region determined by the region format mode determiner 220. Otherwise, the region decoder 230 may decode the coded data of the first region, based on the image format and decoding mode of the first region determined by the region format mode determiner 220. The region decoder 230 may transmit the decoded first region to the region format inverse switch 240.

The region format inverse switch 240 may determine whether to inversely switch the current image format of the decoded first region, based on the image format of the first region determined by the region format mode determiner 220. The region format inverse switch 240 may inversely switch the current image format of the first region to the determined image format, based on a result of the determining.

For example, when the current image format of the first region is determined to be inversely switched to the determined image format, the region format inverse switch 240 may inversely switch the current image format of the first region to the determined image format and then output a restored first region. When the current image format of the first region is determined not to be inversely switched to the determined image format, the region format inverse switch 240 may not change the current image format of the first region and may then output a restored first region.

If the current image format of the first region is different from the determined image format, the region format inverse switch 240 may determine that the current image format of the first region is to be inversely switched to the determined image format.

According to an exemplary embodiment, the parsed information about the image formats and information about the coding modes, which are parsed from the bit stream, may be data including image formats and coding modes determined by analyzing characteristics of the image during generation of the bit stream. Thus, the region format mode determiner 220 may obtain an image format and a coding mode determined by analyzing characteristics of the first region.

For example, in an image characteristics analysis performed during the generation of the bit stream, a number of colors and a gradient of a chroma component of the first region may be determined. The first region may be determined as a synthetic image region, a natural image region, a text region, and a gradation region, based on the determined number of colors and gradient of the chroma component.

For example, according to the image characteristics analysis, a color format of the first region obtained by the region format mode determiner 220 may be determined as a first color format for the synthetic image region, a second color format for the natural image region, a third color format for the text region, or a fourth color format for the gradation region.

Also, according to the image characteristics analysis, a coding mode of the first region obtained by the region format mode determiner 220 may be determined as a first coding mode for the synthetic image region, a second coding mode for the natural image region, a third coding mode for the text region, or a fourth coding mode for the gradation region.

As another example, the image format and coding mode of the first region obtained by the region format mode determiner 220 may be determined based on a control signal during the generation of the bit stream.

As another example, the image format and coding mode of the first region obtained by the region format mode determiner 220 may be determined based on the image characteristics analysis and the control signal.

As another example, during the generation of the bit stream, the image format and coding mode of the first region obtained by the region format mode determiner 220 may be determined to be a combination of an image format and a coding mode, which produces a highest coding efficiency, from among combinations each including one of a plurality of image formats and one of a plurality of coding modes by switching an image format of the first region to each of the plurality of image formats, coding the first region according to each of the plurality of coding modes, and comparing results of the switching and the results of the coding.

The region decoder 230 may decode the first region according to the decoding mode, which is determined by the region format mode determiner 220, by using at least one of transformation domain decoding or pixel domain decoding.

The region format inverse switch 240 may inversely switch at least one of a color model and a color resolution of the first region according to the image format of the first region determined by the region format mode determiner 220. For example, if both the color model and the color resolution of the first region are to be inversely switched, the region format inverse switch 240 may down-sample or up-sample a current color resolution of the first region to a determined color resolution, and switch a current color model of the first region to a determined color model.

Restored regions of the plurality of regions of the coded image, which are output from the region decoder 230 or the region format inverse switch 240, may be stored in a restored image storage unit (not shown), and may be reconstructed to restore the original image.

Figure 3:
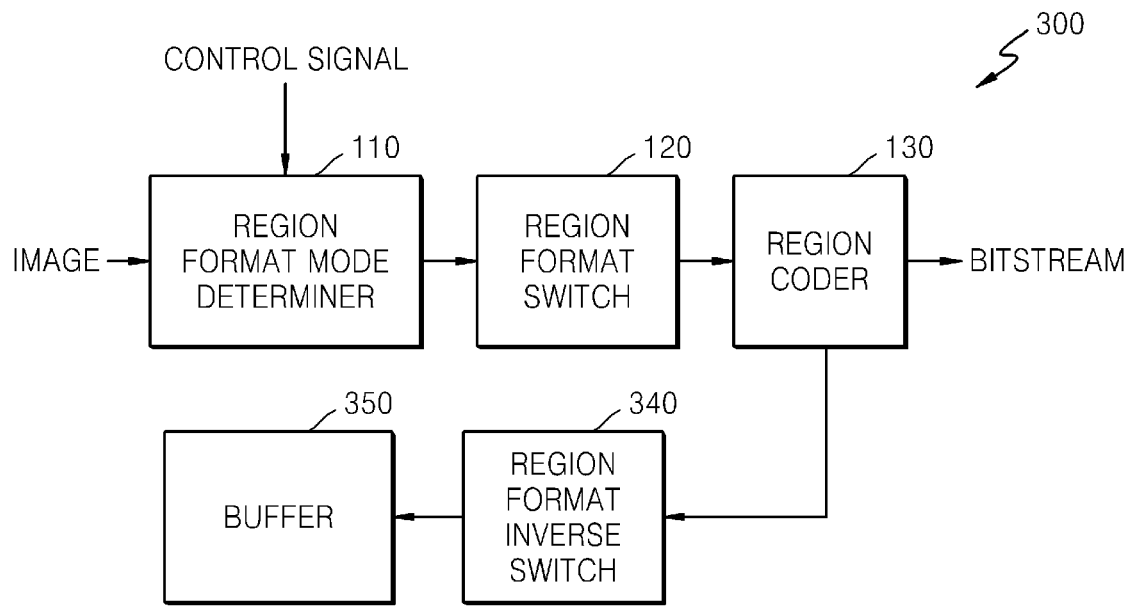
FIG. 3 is a block diagram of an image coding apparatus according to an exemplary embodiment.

FIG. 3 is a block diagram of an image coding apparatus 300 according to another exemplary embodiment. The image coding apparatus 300 further includes a region format inverse switch 340 and a buffer 350, compared to the image coding apparatus 100 according to the previous embodiment. Referring to FIG. 3, a region format mode determiner 110 may determine an image format and coding mode of a current region from among a plurality of input images, based on at least one of image characteristics analysis performed in units of the plurality of regions and a control signal.

According to an exemplary embodiment, the region format mode determiner 110 may variably determine an image format and a coding mode of the current region, based on a control signal indicating computing capabilities of the image coding apparatus 300 or network situations.

For example, if a control signal indicating that CPU resources of the system are insufficient and fast data processing is thus required is input to the region format mode determiner 110, then the region format mode determiner 110 may determine a pixel domain coding mode having a YUV 4:2:0 format or a transformation domain coding mode of the YUV 4:2:0 format.

For example, if a control signal indicating that a network bandwidth is insufficient and a data amount of a bit stream that is to be output as a result of coding needs to be thus reduced is input to the region format mode determiner 110, then the region format mode determiner 110 may determine the transformation domain coding mode of the YUV 4:2:0 format or the transformation domain coding mode of the YUV 4:2:0 format.

The image format switch 120 may determine whether to switch an image format of the current region, and then maintain a current image format of the current region or switch the current image format of the current region to a determined image format of the current region. The region coder 130 may code the current region according to the determined image format and coding mode of the current region.

For example, a result of coding the current region performed by the region coder 130 may be output via a bit stream. The result of the coding output from the region coder 130 may be used to code a subsequent region from among the plurality of regions. The region coder 130 may decode the result of the coding according to a current coding mode to obtain a restored current region, and provide the restored current region to the region format inverse switch 340.

According to an exemplary embodiment, the region format inverse switch 340 may inversely switch an image format of the restored current region to the original image format. As another example, the region format inverse switch 340 may switch the image format of the restored current region according to the image format of the subsequent region. If the image format of the subsequent region is the same as the original image format, a current image format of the restored current region may be inversely switched to the original image format. If the image format of the subsequent region is different from the original image format, the current image format of the restored current region may be switched to an image format other than the original image format.

The restored current region, the image format of which is inversely switched by the region format inverse switch 340 may be stored in the buffer 350. The restored current region stored in the buffer 350 may be referred to during coding of the subsequent region.

Unlike a general natural image consisting of only one still image and one video, a screen image may have different image characteristics in units of regions thereof. For example, one screen image may include at least one natural image region and at least one synthetic image region.

According to a still image codec, such as Joint Photographic Experts Group (JPEG), or a video codec, such as Moving Picture Experts Group (MPEG) and H.264, a screen image is processed in the form of a bitmap. Such still image codecs and video codecs are appropriate to code/decode natural images, e.g., a photo, and are not appropriate to code/decode synthetic images, e.g., a graphic image. When codecs that are appropriate to code/decode natural images are used to process a synthetic image containing a graphic component having many high-frequency regions or a text component, undesired noise, e.g., ring artifacts, may be generated.

Thus, a particular synthetic image codec used to code/decode synthetic images, e.g., a graphic image, may be used. However, some of synthetic images may be effectively coded/decoded using a codec appropriate to process a natural image. When an image processing system classifies images only into synthetic images and natural images and applies only a synthetic image codec to the synthetic images, it may be impossible to individually select coding/decoding modes appropriate for unique characteristics of some of the synthetic images, thereby degrading a coding efficiency.

For example, a bit-depth may be reduced or quantization may be performed on a pixel domain to reduce a data rate of a bit stream to be generated by coding a synthetic image, such as a graphic image. However, when a bit-depth is reduced or quantization is performed on a pixel domain to code a synthetic image, including a gradation image, contouring artifacts may occur in a restored image.

Also, to reduce a data rate of a bit stream obtained by coding an image having an RGB format or increase a data processing speed, a color format of the image may be switched from the RGB format to a YUV format and sub-sampling may be performed on U and V color components during a coding process. However, when during coding of a synthetic image with many primary color components, a color format of the synthetic image is switched from the RGB format to the YUV format and sub-sampling is then performed on U and V color components, the original colors of a restored image may be changed or aliasing artifacts may occur in the restored image.

The image coding apparatuses 100 and 300 and the image decoding apparatus 200 according to exemplary embodiments are capable of analyzing characteristics of an image in units of regions of the image and coding/decoding the regions of the image according to image formats and coding modes thereof determined according to a result of the analyzing. For example, the image coding apparatus 100 or 300 may determine an image format and coding mode of each of regions of a screen image by analyzing image characteristics or a control signal in units of the regions. The image coding apparatuses 100 and 300 may determine whether an image format of each of the regions of the screen image is to be switched, switch the image format or maintain the image format according to a result of the determining, and code each of the regions according to the determined coding mode thereof.

Since the image coding apparatus 100 or 300 may variably determine an image format and coding mode of each of regions of an image according to characteristics thereof, an amount of data calculation may be reduced, thereby increasing a data processing speed. Also, since an amount of data coded by the image coding apparatus 100 or 300 is reduced, a bandwidth may also be reduced when a bit stream containing the coded data is transmitted. Also, the image coding apparatus 100 or 300 may change an image format and a coding mode according to processing capabilities of an operating system and a network bandwidth to efficiently code an image under various computing and network environments.

The image decoding apparatus 200 may parse an image format and coding mode of each of regions of an image, which are appropriately determined by the image coding apparatus 100 or 300, from a bit stream containing a result of coding the image, and exactly determine an image format and decoding mode of regions included in the coded image. Thus, the image decoding apparatus 200 may restore the original image by decoding the bit stream of the coded image while minimizing distortion of a restored image compared to the original image.

Thus, the image coding apparatuses 100 and 300 and the image decoding apparatus 200 are capable of improving a coding/decoding efficiency and performance of each of regions of an image that is a mixture of a synthetic image and a natural image. Also, visual degradation may be minimized based on an image format and a coding mode that are adaptively determined in units of regions of an image.

Operations of the image coding apparatus 100 and the image decoding apparatus 200 will now be described in detail with reference to FIGS. 4 to 9.

Figure 4:
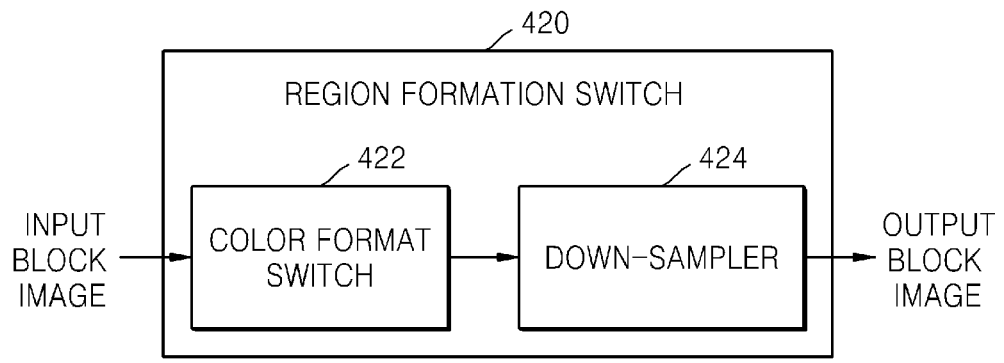
FIG. 4 is a block diagram of a region format switch according to an exemplary embodiment.

FIG. 4 is a block diagram of a region format switch 420 according to an exemplary embodiment. The region format switch 420 may be an exemplary embodiment of the region format switch 120 of FIG. 1.

According to an exemplary embodiment, the region format mode determiner 110 of FIG. 1 may determine a first color model and a first color resolution as formats of an input block image that is a region of an input image. Although it may be hereinafter assumed for convenience of explanation that a region of the input image is an input block image, the exemplary embodiments are not limited thereto and shapes or sizes of regions of an input image, image formats and coding modes of which will be determined are not limited.

The region format switch 420 may compare a current color model and color resolution of the input block image with the first color model and the first color resolution, and determine whether at least one of the current color model and color resolution of the input block image is to be changed.

The region format switch 420 may control a color format switch 422 to switch the current color model to the first color model when the current color model and color resolution of the input block image are different from the first color model and the first color resolution, and may control the color format switch 422 not to switch the current color model to the first color model when the current color model and color resolution of the input block image is the same as the first color model and the first color resolution.

For example, if the color model of the input block image is an RGB color model and the first color model is a YUV color model, the color format switch 422 may switch the color model of the input block image from the RGB color model to the YUV color model.

If both the color model of the input block image and first color model are the YUV color models, the color format switch 422 may directly output the input block image without changing the color model of the input block image.

The region format switch 420 may control a down-sampler 424 to switch the current color resolution of the input block image to the first color resolution when the current color model is different from the first color resolution, and may control the down-sampler 424 not to change the current color resolution when the current color model is the same as the first color resolution. The down-sampler 424 may lower a resolution of an image in units of color components of the image.

For example, if the input block image has a YUV 4:4:4 format and the first color resolution is a YUV 4:2:0 format, the down-sampler 424 may switch a color resolution of the input block image from YUV 4:4:4 to YUV 4:2:0. In other words, resolutions of U and V components of the input block image having the YUV 4:4:4 format may be reduced to half.

For example, if the input block image has the YUV 4:4:4 format and the first color resolution is YUV 4:4:4, the down-sampler 424 may directly output the input block image without changing the color resolution thereof.

FIG. 4 illustrates a case where the down-sampler 424 of the region format switch 420 reduces the color resolution of the input block image to switch the color resolution of the input block image, but the exemplary embodiments are not limited thereto. The resolution of the input block image may be increased by switching a color format of the input block image from the YUV 4:2:0 format to the YUV 4:2:2 format or the YUV 4:4:4 or from the YUV 4:2:2 format to the YUV 4:4:4 format.

Figure 5:
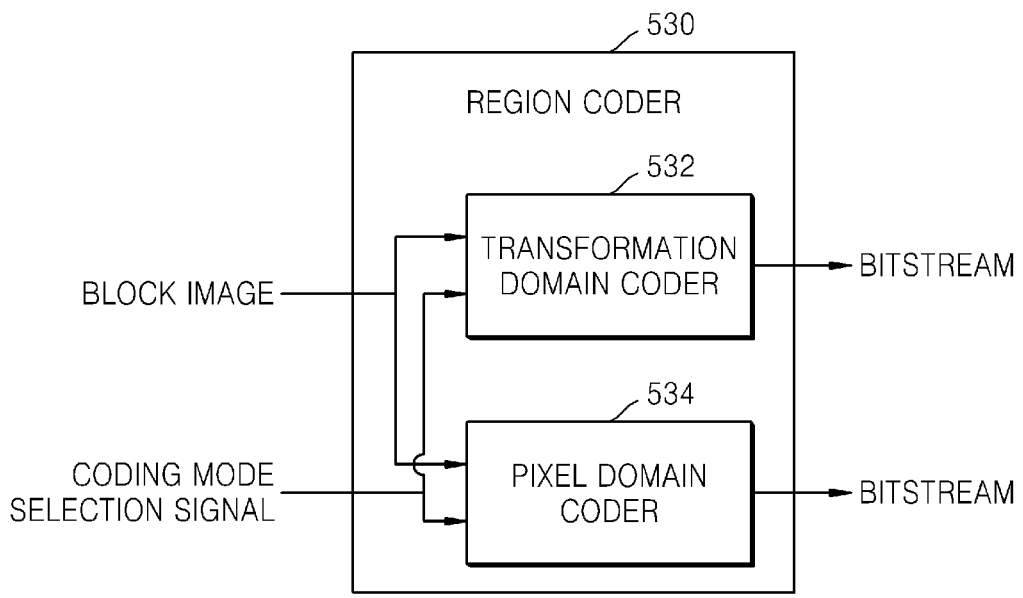
FIG. 5 is a block diagram of a region coder according to an exemplary embodiment.

FIG. 5 is a block diagram of a region coder 530 according to an exemplary embodiment. The region coder 530 may be an exemplary embodiment of the region coder 130 of FIG. 1.

According to an exemplary embodiment, the format mode determiner 110 of FIG. 1 may determine one of a transformation domain coding mode and a pixel domain coding mode as a coding mode of an input block image that is a region of an input image.

The transformation domain coding mode may be understood as a coding method of transforming a domain of image data, quantizing the transformed domain, and performing entropy coding on a result of the quantizing. For example, the transformation domain coding mode is employed in JPEG, which is a standard still image codec, and H.264, which is a standard moving picture codec, to perform coding/decoding. The pixel domain coding mode may be understood as a coding mode of compressing data of an input image to reduce an amount of the data of the input image without having to perform domain transformation. For example, Lossless JPEG (JPEG-LS) which is a standard still image codec employs the pixel domain coding mode to perform coding/decoding.

The region format mode determiner 110 may output a coding mode selection signal containing a result of determining a coding mode, and the region coder 530 may selectively control a transformation domain coder 532 or a pixel domain coder 534, based on the coding mode selection signal.

If the coding mode selection signal indicates the transformation domain coding mode, the region coder 530 may control the transformation domain coder 532 to operate. In other words, the transformation domain coder 532 may code an input block image in a transformation domain and output a bit stream containing a result of the coding. If a result of coding a current block is used to code a subsequent block, the transformation domain coder 532 may inversely transform the coded current block, decode a result of the transforming to obtain a restored current block, and then output the restored current block.

If the coding mode selection signal indicates the pixel domain coding mode, the region coder 530 may control the pixel domain coder 534 to operate. In other words, the pixel domain coder 534 may code the input block image in a pixel domain and output a bit stream containing a result of the coding. If a result of coding a current block is used to code a subsequent block, the pixel domain coder 534 may decode the coded current block to obtain a restored current block, and then output the restored current block.

Figure 6:
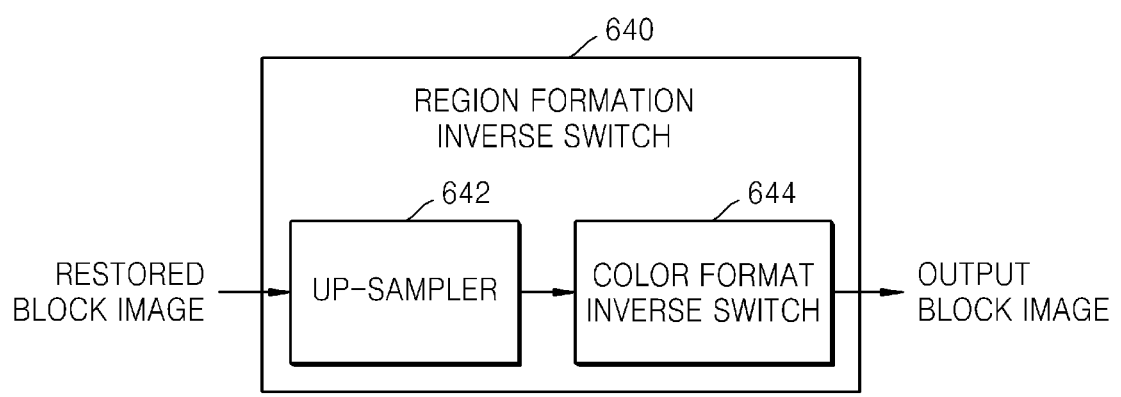
FIG. 6 is a block diagram of a region format inverse switch according to an exemplary embodiment.

FIG. 6 is a block diagram of a region format inverse switch 640 according to an exemplary embodiment. The region format inverse switch 640 may be an embodiment of the region format inverse switch 240 of FIG. 2 or the region format inverse switch 340 of FIG. 3.

According to an exemplary embodiment, the region format inverse switch 640 may receive a block image restored by performing a decoding process. According to an exemplary embodiment, the region format inverse switch 640 may determine whether an image format of the restored block image is to be inversely switched, based on an image format determined by the region format mode determiner 220 of FIG. 2 or the region format mode determiner 110 of FIG. 3.

The region format inverse switch 640 may determine whether at least one of a current clock model and a current color resolution of the restored block image is to be changed. In order to output a restored block image of a predetermined second color model and a predetermined second color resolution, the region format inverse switch 640 may determine whether at least one of the color model and color resolution of the restored block image is to be changed, based on the predetermined second color model and the predetermined second color resolution.

For example, if a restored block image of a current block image will be used to code a subsequent block image, then the region format inverse switch 640 may determine whether at least one of a current color model and color resolution of the restored block image is to be changed, based on a color model and color resolution of the subsequent block image. For example, the region format inverse switch 640 may determine whether at least one of the current color model and color resolution of the restored block image is to be changed, based on color models and color resolutions of block images that may be allowed to be stored in the buffer 350 of FIG. 3 in which the restored block image is to be stored.

According to an exemplary embodiment, the predetermined second color model and the predetermined second color resolution may be the same as the original color model and the original color resolution of the current block image. In this case, the region format inverse switch 640 may inversely switch at least one of the color model and the color resolution of the restored block image to the original color model and/or the original color resolution of the current block image.

The predetermined second color model may be different from the original color model of the current block image, and the predetermined second color resolution may also be different from the original color resolution of the current block image. In this case, the region format inverse switch 640 may repeatedly switch at least one of the color model and the color resolution of the restored block image to the predetermined second color model and/or the predetermined second color resolution.

If the current color resolution of the restored block image is different from the predetermined second color resolution, the region format inverse switch 640 may switch the color resolution to the predetermined second color resolution. If the current color resolution of the restored block image is the same as the predetermined second color resolution, the region format inverse switch 640 may control an up-sampler 642 not to change the current color resolution. The up-sampler 642 may increase a resolution of each of components of an image.

For example, if the restored block image has the YUV 4:2:0 format and the second color resolution is YUV 4:4:4, the up-sampler 642 may switch the color resolution of the restored block image from YUV 4:2:0 to YUV 4:4:4. In other words, a resolution of each of a U component and V component of the block image having the YUV Y 4:2:0 format may be increased by half the resolution.

For example, if the restored block image has the YUV 4:4:4 format and the second color resolution is YUV 4:4:4, the up-sampler 642 may directly output the restored block image without changing the color resolution of the restored block image.

Although FIG. 6 illustrates a case where the up-sampler 642 of the region format inverse switch 640 increases a color resolution of the restored block image to switch the color resolution of the restored block image, the exemplary embodiments are not limited thereto and the color resolution may be reduced by switching YUV 4:4:4 to YUV 4:2:2 or YUV 4:2:0 or switching YUV 4:2:2 to YUV 4:2:0.

Thus, the region format switch 420 may control a color format inverse switch 644 to inversely switch the current color model of the restored block image to the predetermined second color model when the current color model is different from the predetermined second color model, and not to change the current color model when the current color model is the same as the predetermined second color model.

For example, if the current color model of the restored block image is a YUV color model and the predetermined second color model is an RGB color model, the color format inverse switch 644 may switch the current color model from the YUV color model to the RGB color model.

For example, if both the current color model of the restored block image and the predetermined second color model are YUV color models, the color format inverse switch 644 may directly output the restored block image without changing the current color model of the restored block image.

The color format inverse switch 644 may output the restored block image, at least one of the current color model and color resolution of which is inversely switched. Thus, at least one of the current color model and color resolution may be inversely switched to the original color model and/or the original color resolution of current block image or may be switched to a new color model and/or a new color resolution. Also, the color format inverse switch 644 may directly output the restored block image without switching the current color model and color resolution thereof.

Figure 7:
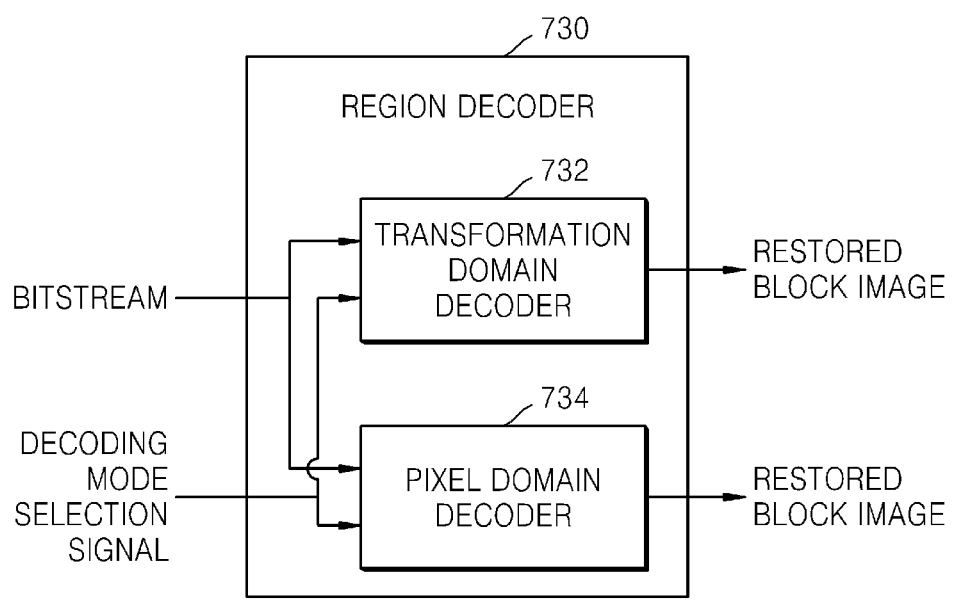
FIG. 7 is a block diagram of a region decoder according to an exemplary embodiment.

FIG. 7 is a block diagram of a region decoder 730 according to an exemplary embodiment. The region decoder 730 may be an exemplary embodiment of the region decoder 230 of FIG. 2.

According to an exemplary embodiment, the region format mode determiner 220 of FIG. 2 may determine a decoding mode for a bit stream containing a coded block image as a transformation domain decoding mode or a pixel domain decoding mode, based on coding mode information about the coded block image parsed from the bit stream. Then, the region format mode determiner 220 outputs a decoding mode selection signal indicating the determined decoding mode, and the region decoder 730 may selectively control a transformation domain decoder 732 or a pixel domain decoder 734 according to the decoding mode selection signal.

If the decoding mode selection signal indicates the transformation domain decoding mode, the region decoder 730 may control the transformation domain decoder 732 to operate. In other words, the transformation domain decoder 732 may decode the bit stream containing the coded block image in a transformation domain and then output a restored block image.

If the decoding mode selection signal indicates the pixel domain decoding mode, the region decoder 730 may control the pixel domain decoder 734 to operate. In other words, the pixel domain decoder 734 may decode the bit stream containing the coded block image in a pixel domain and then output a restored block image.

Figure 8:
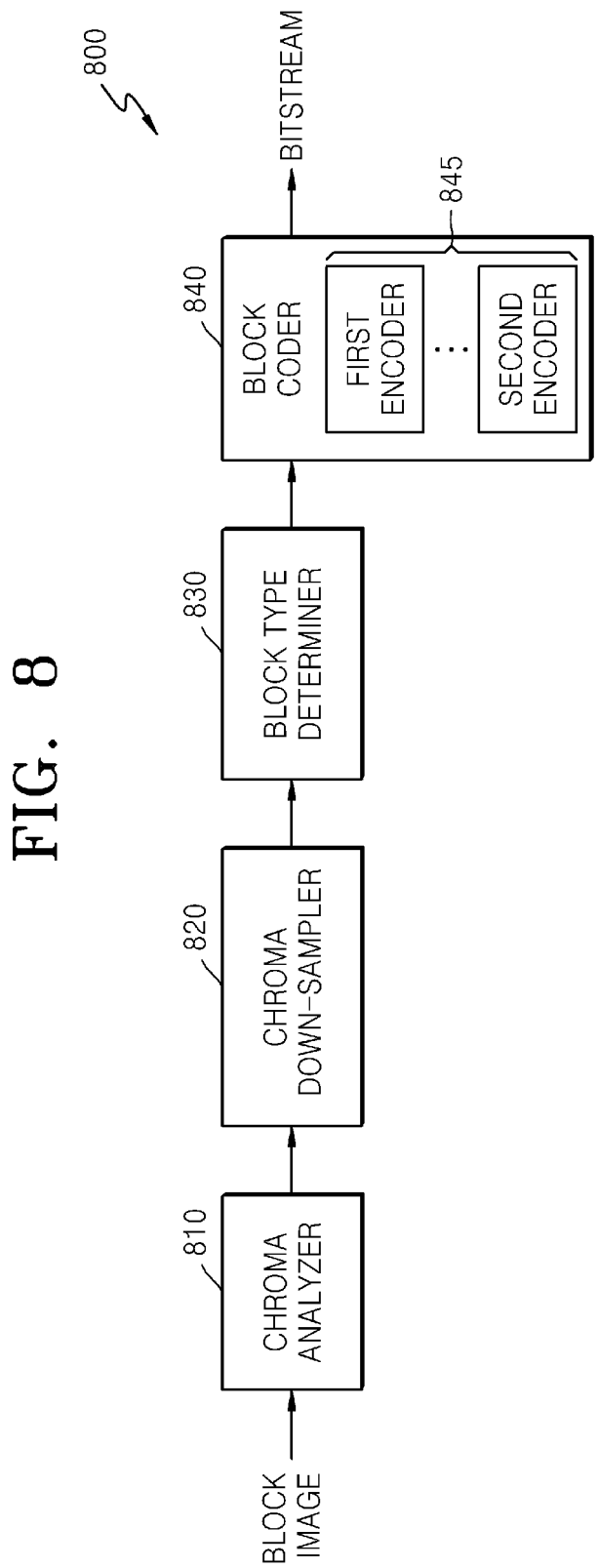
FIG. 8 is a block diagram of a block coding apparatus according to an exemplary embodiment.

FIG. 8 is a block diagram of a block coding apparatus 800 according to an exemplary embodiment. The block coding apparatus 800 may be an exemplary embodiment of the image coding apparatus 100 of FIG. 1 or the image decoding apparatus 300 of FIG. 3. The block coding apparatus 800 includes a chroma analyzer 810, a chroma down-sampler 820, a block type determiner 830, and a block coder 840.

The block coding apparatus 800 receives and codes a block image of a YUV color model. The chroma analyzer 810 may determine a color resolution for coding the block image by analyzing a chroma component of the block image. For example, if the block image has the YUV 4:4:4 format, examples of the determined color resolution may be YUV 4:4:4, YUV 4:2:2, and YUV 4:2:0.

According to an exemplary embodiment, the chroma analyzer 810 may determine gradations between all pixels of the chroma component of the block image. If the gradations between all pixels of the chroma component are less than a predetermined gradation threshold THg, the chroma analyzer 810 may determine the color resolution as YUV 4:2:0 or YUV 4:2:2. If the gradations between all pixels of the chroma component are equal to or greater than the predetermined gradation threshold THg, the chroma analyzer 810 may determine the color resolution as YUV 4:4:4.

For example, the predetermined gradation threshold THg may be set according to a quantization parameter (QP). That is, the predetermined gradation threshold THg may vary according to the quantization parameter QP.

As another example, the chroma analyzer 810 may variably determine a down-sampling filter according to complexity of the block image.

The chroma down-sampler 820 may change a color resolution of the block image according to the color resolution determined by the chroma analyzer 810. That is, if the determined color resolution is YUV 4:2:2 or YUV 4:2:0, then the chroma down-sampler 820 may down-sample the block image from, for example, the YUV 4:4:4 format to the YUV 4:2:2 format or the YUV 4:2:0 format.

The chroma analyzer 810 may determine a number of colors of the block image by analyzing the chroma component of the block image. If the number of colors of the block image is less than a predetermined color threshold THc, the chroma analyzer 810 may determine the block image as a text region or a gradation region. If the number of colors of the block image is equal to or greater than the predetermined color threshold THc, the chroma analyzer 810 may determine the block image as a natural image region or a synthetic image region that includes primary colors.

The block type determiner 830 may determine a block type of the block image, based on a result of analyzing the gradations between all the pixels of the chroma component and a result of analyzing the number of colors of the block image. The determined block type may be classified as the synthetic image region, the natural image region, the text region, or the gradation region.

For example, if the number of colors is equal to or greater than the predetermined color threshold THc and the gradations between all pixels of the chroma component are equal to or greater than the predetermined gradation threshold THg, then the block type determiner 830 may determine the block type as the synthetic image region.

For example, if the number of colors is equal to or greater than the predetermined color threshold THc and the gradations between all the pixels of the chroma component are less than the predetermined gradation threshold THg, then the block type determiner 830 may determine the block type as the natural image region.

For example, if the number of colors is less than the predetermined color threshold THc and the gradations between all the pixels of the chroma component are equal to or greater than the predetermined gradation threshold THg, then the block type determiner 830 may determine the block type as the text region.

For example, if the number of colors is less than the predetermined color threshold THc and the gradations between all the pixels of the chroma component are less than the predetermined gradation threshold THg, then the block type determiner 830 may determine the block type as the gradation region.

The block type determiner 830 may determine a coding mode of the block image, based on the determined block type. If the block type is the synthetic image region, a synthetic image coding mode may be selected. If the block type is the natural image region, a natural image coding mode may be selected. If the block type is the text region, a pulse code modulation (PCM) index coding mode may be selected. If the block type is the gradation region, a natural image coding mode may be selected.

More specifically, the block type determiner 830 may select the synthetic image coding mode of the YUV 4:4:4 format when the block type is the synthetic image region, select the natural image coding mode of YUV 4:2:0 format when the block type is the natural image region, select the PCM index coding mode of the YUV 4:4:4 format when the block type is the text region, and select the natural image coding mode of the YUV 4:2:0 format when the block type is the gradation region, as shown in following Table 1:

TABLE 1

|  | A number of Colors >= THc | A number of Colors < THc |
| --- | --- | --- |
| U, V Gradient >= THg | Synthetic Image Region (Synthetic, 444) | Text Region (PCM Index, 444) |
| U, V Gradient < THg | Natural Image Region (Natural, 420) | Gradation Region (Natural, 420) |

The block coder 840 may code the block image, based on the determined block type. The block coder 840 may include an encoder set 845 including a plurality of encoders for performing coding according to different coding modes. The block coder 840 selects an encoder from the encoder set 845 to code the block image according to a coding mode selected based on the block type of the block image, and controls the selected encoder to code the block image.

For example, if the block type of the block image is the synthetic image region, the block coder 840 may select a first encoder that performs coding according to the synthetic image coding mode of the YUV 4:4:4 format from the encoder set 845, and control the first encoder to code the block image.

For example, if the block type of the block image is the natural image region, the block coder 840 may select a second encoder that performs coding according to the natural image coding mode of the YUV 4:2:0 format from the encoder set 845, and control the second encoder to code the block image.

For example, if the block type of the block image is the text region, the block coder 840 may select a third encoder that performs coding according to the PCM index coding mode of the YUV 4:4:4 format from the encoder set 845, and control the third encoder to code the block image.

For example, if the block type of the block image is the gradation region, the block coder 840 may select a fourth encoder that performs coding according to the natural image coding mode of the YUV 4:2:0 format from the encoder set 845, and control the fourth encoder to code the block image.

Accordingly, the block coder 840 may output a bit stream containing the coded block image.

Figure 9:
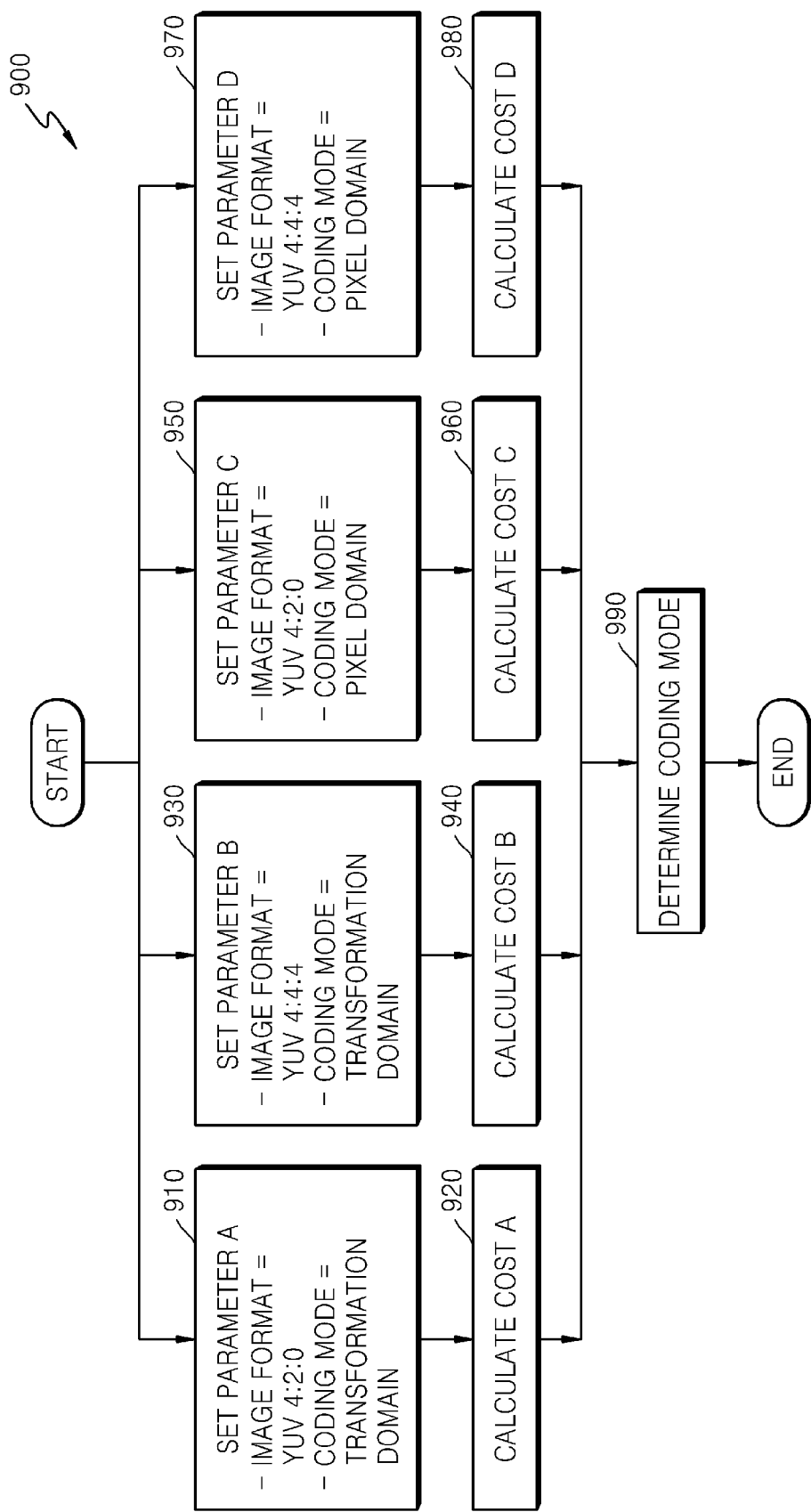
FIG. 9 is a block diagram illustrating a method of determining a region format mode, according to an exemplary embodiment.

FIG. 9 is a block diagram 900 illustrating a method of determining a region format mode, according to an exemplary embodiment. According to exemplary embodiment, the region format mode determiner 110 may determine a combination of an image format and a coding mode, which produces a highest coding efficiency, from among combinations each including one of a plurality of image formats and one of a plurality of coding modes by switching an input image region to each of the plurality of image formats, coding the input image region according to each of the plurality of coding modes, and comparing results of the switching and the results of the coding.

According to an exemplary embodiment, the region format mode determiner 110 sets parameters according to combinations each including one of a plurality of image formats and one of a plurality of coding modes, and performs coding according to the parameters. A coding cost calculated using a result of the coding may be used as an index of coding efficiency. For example, to determine a coding efficiency, a size of a bit stream for transmitting the result of the coding, and a rate-distortion cost (R-D cost) that represents a distortion rate of a restored image compared to the original image may be determined.

Referring to FIG. 9, in operation 910, the region format mode determiner 110 sets a parameter A representing a combination of the YUV 4:2:0 format and the transformation domain coding mode. In operation 920, based on the parameter A, the region format switch 120 may switch a current image format to the YUV 4:2:0 format and the region coder 130 may perform coding according to the transformation domain coding mode of the YUV 4:2:0 format. Then, the region format mode determiner 110 may calculate a coding cost A from a result of performing coding according to the parameter A by the region coder 130.

In operation 930, the region format mode determiner 110 sets a parameter B representing a combination of the YUV 4:4:4 format and the transformation domain coding mode. In operation 940, based on the parameter B, the region format switch 120 may switch the current image format to the YUV 4:4:4 format and the region coder 130 may perform coding according to the transformation domain coding mode of the YUV 4:4:4 format. Then, the region format mode determiner 110 may calculate a coding cost B from a result of performing coding according to the parameter B by the region coder 130.

In operation 950, the region format mode determiner 110 sets a parameter C representing a combination of the YUV 4:2:0 format and the pixel domain coding mode. In operation 960, based on the parameter C, the region format switch 120 may switch the current image format to the YUV 4:2:0 format and the region coder 130 may perform coding according to the pixel domain coding mode of the YUV 4:2:0 format. Then, the region format mode determiner 110 may calculate a coding cost C from a result of performing coding according to the parameter C by the region coder 130.

In operation 970, the region format mode determiner 110 sets a parameter D representing a combination of the YUV 4:4:4 format and the pixel domain coding mode. In operation 980, based on the parameter D, the region format switch 120 may switch the current image format to the YUV 4:4:4 format and the region coder 130 may perform coding according to the pixel domain coding mode of the YUV 4:4:4 format. Then, the region format mode determiner 110 may calculate a coding cost D from a result of performing coding according to the parameter D by the region coder 130.

In operation 990, the region format mode determiner 110 may determine a parameter that produces a minimum coding cost from among the parameters A to D by comparing the coding codes A to D. Then, the region format mode determiner 110 may determine a color format and a coding mode corresponding to the determined parameter as an optimum image format and coding mode.

Figure 10:
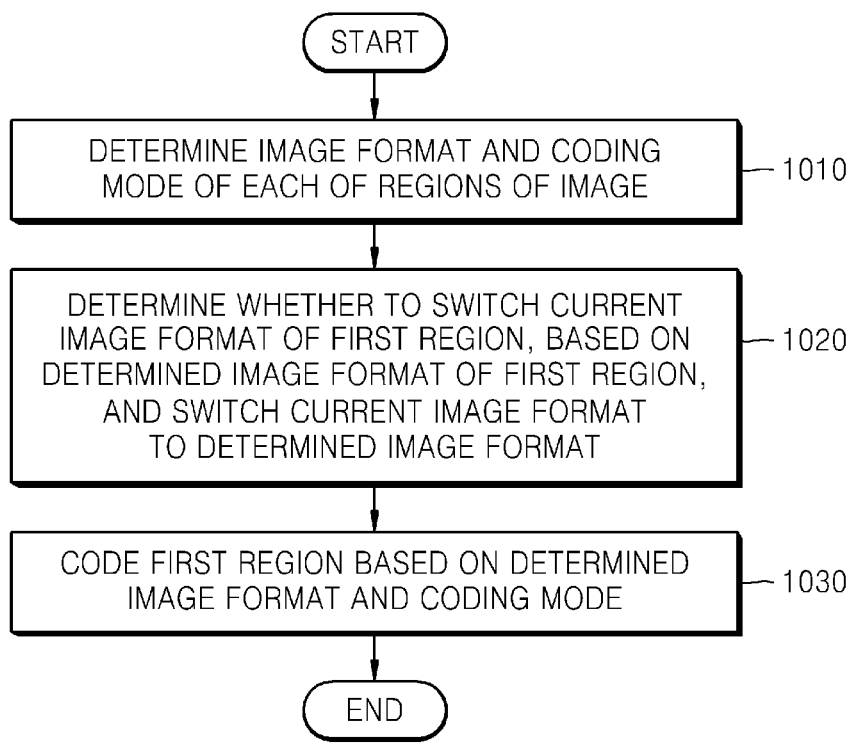
FIG. 10 is a flowchart illustrating an image coding method according to an exemplary embodiment.

FIG. 10 is a flowchart illustrating an image coding method according to an exemplary embodiment. In operation 1010, at least one of an image format and a coding mode is determined in units of regions of an input image. A coding mode of each of the regions may be determined as the transformation domain coding mode or the pixel domain coding mode. An image format of each of the regions may be at least one of a color model and a color resolution of a color format. For example, the image format of each of the regions may be determined as the color format, e.g., the YUV 4:4:4 format, the YUV 4:2:2 format, and the YUV 4:2:0 format.

In operation 1020, whether a current image format of, for example, a first region of the input image is to be switched, is determined based on the corresponding image format thereof determined in operation 1010. The current image format of the first region may be switched to the corresponding image format determined in operation 1010, based on the determination performed in operation 1020. In other words, the current image format may be switched to the corresponding image format determined in operation 1010 when it is determined that the current image format of each of the regions is to be switched, and is maintained when it is determined that the current image format is not to be switched.

For example, if both a current color model and color resolution of the first region are to be switched, the current color model may be switched to the corresponding color model determined in operation 1010, and the current color resolution may be down-sampled or up-sampled to the corresponding color resolution determined in operation 1010.

In operation 1030, the first region is coded based on the corresponding image format and coding mode determined in operation 1010.

In operation 1010, image characteristics of each of the regions of the input image may be analyzed and an image format and coding mode of, for example, a first region of the input image may be determined based on a result of the analyzing. According to an exemplary embodiment, a number of colors of and a gradation of a chroma component of each of the regions of the input image may be analyzed. Each of the regions of the input image may be classified as the synthetic image region, the natural image region, the text region, or the gradation region, based on results of the analyzing.

If a region of the input image is the synthetic image region, a first color format and a first coding mode may be determined. If a region of the input image is the natural image region, a second color format and a second coding mode may be determined. If a region of the input image is the text region, a third color format and a third coding mode may be determined. If a region of the input image is the gradation region, a fourth color format and a fourth coding mode may be determined.

At least one of information about the image formats of the input image and information about the coding modes of the regions of the input image may be output together with a bit stream containing a result of coding the input image.

Figure 11:
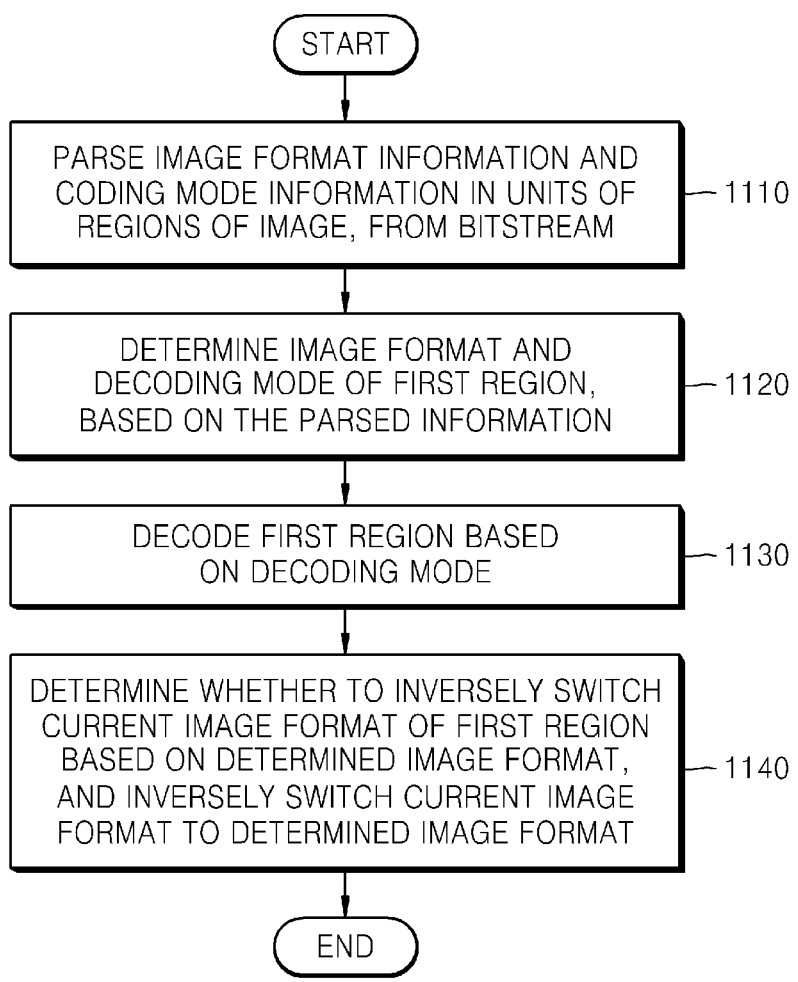
FIG. 11 is a flowchart illustrating an image decoding method according to an exemplary embodiment.

FIG. 11 is a flowchart illustrating an image decoding method according to an exemplary embodiment.

In operation 1110, coded image data and at least one of image format information and coding mode information included in a bit stream containing a result of coding the image are parsed in units of regions of an image.

In operation 1120, an image format and decoding mode of, for example, a first region of the regions of the image are determined based on at least one of the image format information and the coding mode information that are parsed in units of the regions of the image in operation 1110.

According to an exemplary embodiment, the parsed image format information and coding mode information may be data including image formats and coding modes determined based on an image characteristics analysis performed during generation of the bit stream. Thus, an image format and coding mode of, for example, the first region of the image, which are determined based on an image characteristics analysis about the first region, may be obtained from the parsed image format information and the coding mode information.

In operation 1130, the first region is decoded based on the corresponding decoding mode determined in operation 1110 to produce a restored region of the image.

In operation 1140, whether a current image format of the restored region is to be inversely switched is determined, based on the corresponding image format determined in operation 1110. The current image format may be inversely switched to the corresponding image format, based on a result of the determining. The current image format of the restored region may be inversely switched to the original image format of a corresponding region of the original image that was not coded or may be switched to a new image format.

Further, if both a current color model and color resolution of the restored region are to be inversely switched, the current color resolution may be up-sampled or down-sampled to a corresponding color resolution determined in operation 1120, and the current color model is inversely switched to a corresponding color model determined in operation 1120.

Then, restored regions of the image may be output and reconstructed to restore the entire image.

The above exemplary embodiments may be embodied as a computer program. The computer program may be stored in a computer readable recording medium, and executed using a general digital computer. Examples of the computer readable media are magnetic recording media (a ROM, a floppy disc, a hard disc, etc.), and optical recording media (a CD-ROM, a DVD, etc.).

While the present aspects have been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A method of coding an image, the method comprising:
   determining an image format and a coding mode of regions of the image according to color characteristics of the regions;
   determining whether a current image format of a first region from among the regions of the image is to be switched, based on the determined image format; and
   coding the first region, based on the determined image format and the determined coding mode,
   wherein the color characteristics of the first region includes a number of colors of the first region and a gradation of a chroma component of the first region.

2. The method of claim 1, wherein the coding of the first region comprises switching the current image format of the first region to the determined image format, based on a result of the determining of whether the current image format of the first region is to be switched.

3. The method of claim 2, wherein the switching of the current image format of the first region comprises switching at least one of a color model and a color resolution of a current color format of the first region, according to the determined image format.

4. The method of claim 2, wherein the switching of the current image format of the first region comprises switching the current image format to the determined image format when the determined image format and the current image format of the first region are different from each other.

5. The method of claim 1, wherein the determining of the image format and the coding mode comprises:
   analyzing image characteristics of the first region; and
   determining the image format and the coding mode of the first region, based on a result of the analyzing.

6. The method of claim 5, wherein the determining of the image format and the coding mode of the first region comprises determining the image format and the coding mode of the first region, based on the result of the analyzing and a control signal.

7. The method of claim 5, wherein the analyzing of the image characteristics of the first region comprises:
   determining the number of colors of the first region; and
   determining the gradation of the chroma component of the first region.

8. The method of claim 7, wherein the analyzing of the image characteristics of the first region further comprises determining the first region as a synthetic image region, a natural image region, a text region, or a gradation region, based on the determined number of colors and the determined gradation of the chroma component.

9. The method of claim 8, wherein, during the analyzing of the image characteristics of the first region, the first region is determined as the synthetic image region or the natural image region when the number of colors of the first region is equal to or greater than a first threshold, and the first region is determined as the text region or the gradation region when the number of colors of the first region is less than the first threshold.

10. The method of claim 8, wherein, during the analyzing of the image characteristics of the first region, the first region is determined as the synthetic image region or the text region when the gradation of the chroma component of the first region is equal to or greater than a second threshold, and the first region is determined as the natural image region or the gradation region when the gradation of the chroma component of the first region is less than the second threshold.

11. The method of claim 8, wherein the determining of the image format and the coding mode comprises:
   determining a color format of the first region as a first color format for the synthetic image region, a second color format for the natural image region, a third color format for the text region, or a fourth color format for the gradation region; and
   determining the coding mode of the first region as a first coding mode for the synthetic image region, a second coding mode for the natural image region, a third coding mode for the text region, or a fourth coding mode for the gradation region.

12. The method of claim 1, wherein the coding of the first region comprises coding the first region based on at least one of transformation domain coding and pixel domain coding, according to the determined coding mode.

13. A non-transitory computer readable recording medium having recorded thereon a computer program for executing the method of claim 1.

14. A method of decoding an image, the method comprising:
   parsing image format information, coding mode information, and code image data in units of regions of a coded image, from a bit stream containing the coded image;
   determining an image format and a decoding mode of a first region of the regions of the coded image, based on the image format information and the coding mode information parsed in the units of the regions of the coded image, the image format information and the coding mode information comprising color characteristics of the first region;
   decoding coded image data of the first region, based on the determined image format and the determined decoding mode; and
   determining whether a current image format of the first region is to be inversely switched, based on the determined image format,
   wherein the color characteristics of the first region includes a number of colors of the first region and a gradation of a chroma component of the first region.

15. The method of claim 14, further comprising inversely switching the current image format to the determined image format, based on a result of the determining of whether the current image format of the first region is to be inversely switched.

16. The method of claim 15, wherein the inversely switching of the current image format of the first region comprises inversely switching at least one of a color model and a color resolution of a current color format of the first region, according to the determined image format.

17. The method of claim 15, wherein the inversely switching of the current image format of the first region comprises inversely switching the current image format to the determined image format when the determined image format and the current image format of the first region are different from each other.

18. The method of claim 14, wherein the determining of the image format and the decoding mode comprises obtaining an image format and a coding mode that are determined by analyzing image characteristics of the first region.

19. The method of claim 18, wherein the image format and the decoding mode of the first region are determined based a result of the analyzing and a control signal.

20. The method of claim 18, wherein the analyzing of the image characteristics of the first region comprises determining the number of colors of the first region and the gradient of the chroma component of the first region.

21. The method of claim 20, wherein the first region is determined as a synthetic image region, a natural image region, a text region, or a gradation region, based on the number of colors of the first region and the gradient of the chroma component of the first region.

22. The method of claim 21, wherein the first region is determined as the synthetic image region or the natural image region when the number of colors of the first region is equal to or greater than a first threshold, and is determined as the text region or the gradation region when the number of colors of the first region is less than the first threshold.

23. The method of claim 21, wherein the first region is determined as the synthetic image region or the text region when the gradation of the chroma component of the first region is equal to or greater than a second threshold, and is determined as the natural image region or the gradation region when the gradation of the chroma component of the first region is less than the second threshold.

24. The method of claim 21, wherein a color format of the first region is determined as a first color format for the synthetic image region, a second color format for the natural image region, a third color format for the text region, or a fourth color format for the gradation region; and
   the coding mode of the first region is determined as a first coding mode for the synthetic image region, a second coding mode for the natural image region, a third coding mode for the text region, or a fourth coding mode for the gradation region.

25. The method of claim 14, wherein the decoding of the coded image data of the first region comprises decoding the first region based on at least one of transformation domain decoding and pixel domain decoding, according to the determined decoding mode.

26. A non-transitory computer readable recording medium having recorded thereon a computer program for executing the method of claim 14.

27. An apparatus for coding an image, the apparatus comprising:
   a region format mode determiner which determines an image format and a coding mode of regions of the image according to color characteristics of the regions;
   a region format switch which determines whether a current image format of a first region from among the regions of the image is to be switched, based on the determined image format, and switches the current image format to the determined image format, based on a result of the determining of whether the current image format of the first region is to be switched;
   a region coder which codes the first region, based on the determined image format and the determined coding mode; and
   a processor which controls operations of the region format mode determiner, the region format switch, and the region coder,
   wherein the region format mode determiner, the region format switch, the region coder and the processor are implemented in a hardware device, and
   wherein the color characteristics of the first region includes a number of colors of the first region and a gradation of a chroma component in the first region.

28. An apparatus for decoding an image, the apparatus comprising:
   a bit stream parser which parses image format information, coding mode information, and code image data in units of regions of a coded image, from a bit stream containing the coded image;
   a region format mode determiner which determines an image format and a decoding mode of a first region of the regions of the coded image, based on the image format information and the coding mode information that are parsed in the units of the regions of the coded image, the image format information and the coding mode information comprising color characteristics of the first region;
   a region decoder which decodes coded image data of the first region, based on the determined image format and decoding mode;
   a region format inverse switch which determines whether a current image format of the first region is to be inversely switched, based on the determined image format, and inversely switches the current image format to the determined image format, based on a result of the determining of whether the current image format of the first region is to be inversely switched; and a processor which controls operations of the bit stream parser, the region format mode determiner, the region decoder, and the region format inverse switch, wherein the bit stream parser, the region format mode determiner, the region decoder, the region format inverse switch and the processor are implemented in a hardware device, and wherein the color characteristics of the first region includes a number of colors of the first region and a gradation of a chroma component of the first region.

\* \* \* \* \*